(12) United States Patent
Young

(10) Patent No.: US 11,821,574 B1
(45) Date of Patent: Nov. 21, 2023

(54) PANEL MOUNT BASE

(71) Applicant: Jonathan Young, Troutville, VA (US)

(72) Inventor: Jonathan Young, Troutville, VA (US)

( * ) Notice: Subject to any disclaimer, the term of this patent is extended or adjusted under 35 U.S.C. 154(b) by 675 days.

(21) Appl. No.: 16/945,836

(22) Filed: Aug. 1, 2020

(51) Int. Cl.
| | | |
|---|---|---|
| *F16M 13/02* | (2006.01) | |
| *F16B 37/04* | (2006.01) | |
| *F24S 25/63* | (2018.01) | |
| *F24S 25/60* | (2018.01) | |
| *F24S 25/00* | (2018.01) | |

(52) U.S. Cl.
CPC ........... *F16M 13/02* (2013.01); *F16B 37/045* (2013.01); *F24S 25/63* (2018.05); *F16B 2200/40* (2018.08); *F24S 2025/6005* (2018.05); *F24S 2025/801* (2018.05)

(58) Field of Classification Search
CPC .. F16M 13/02; F24S 25/63; F24S 2025/6005; F24S 2025/801; F24S 25/61; F24S 2025/6003; F16B 37/045; F16B 2200/40; H02S 20/23; H02S 20/30; H02S 30/10
See application file for complete search history.

(56) References Cited

U.S. PATENT DOCUMENTS

| | | | | |
|---|---|---|---|---|
| 8,938,932 | B1* | 1/2015 | Wentworth | F24S 25/61 |
| | | | | 52/173.3 |
| 9,800,200 | B2* | 10/2017 | Higuchi | H02S 30/10 |
| 9,813,013 | B2* | 11/2017 | McPheeters | F24S 25/70 |
| 10,312,853 | B2* | 6/2019 | MacRostie | F24S 25/636 |
| 10,605,282 | B1* | 3/2020 | Young | F16B 5/0685 |
| 10,951,157 | B1* | 3/2021 | Young | H02S 30/10 |
| 2011/0260027 | A1* | 10/2011 | Farnham, Jr. | F24S 25/636 |
| | | | | 248/309.1 |
| 2015/0129517 | A1* | 5/2015 | Wildes | F24S 25/632 |
| | | | | 211/41.1 |
| 2016/0025262 | A1* | 1/2016 | Stearns | E04D 13/10 |
| | | | | 248/220.22 |
| 2016/0268958 | A1* | 9/2016 | Wildes | H02S 20/23 |
| 2018/0375461 | A1* | 12/2018 | Stearns | H02S 20/23 |

\* cited by examiner

*Primary Examiner* — Alfred Basichas
(74) *Attorney, Agent, or Firm* — Lech Law, LLC; Robert R. Lech

(57) ABSTRACT

A panel mounting device base and kit therefor are described herein. The described base comprises: a lower member, an upper member, a surface fastener, and a connecting fastener. The profile of the lower member and the profile of the upper member are identical, and the lower member and the upper member are rotated about its longitudinal axis 180 degrees relative to each other and attached to form the base. The base is secured to a surface, and the base receives a panel mounting device to retain a panel.

17 Claims, 3 Drawing Sheets

PANEL MOUNT BASE

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

Technical Field

The present invention generally relates to attachment kits, devices, and systems for panel mounting devices. More particularly, the present invention relates to bases for receiving a mounting device for securing panels, such as photovoltaic panels, for example, to a surface such as a roof.

Background and Description of Related Art

Panel mounting devices and systems are well known. Such mounting devices and systems may be used to mount one or more panels, including tiles, video display panels, and photovoltaic (solar) panels.

The inventive devices and systems described herein improve upon prior art panel attachment devices and systems. Prior art panel mounting systems typically employ one of two techniques. According to a first technique, rails spanning one dimension of a matrix of panels are secured to a surface, and the panels are attached to the rails using clamps. According to a second technique, panels are secured directly to a support surface, possibly using various clamps that attached directly to the surface. The clamps secure one or more panels in place.

Ordering, tracking, warehousing, and installation all these different rails and clamp types can cause inefficiencies to producers, distributors and installers. Therefore, there is a need for a clamp device and system that addresses the aforementioned shortcomings of the prior art.

Mounting systems are described herein that comprise bases upon which clamps may be attached. The bases described herein advantageously eliminate the need for long and bulky rails, thereby reducing the inefficiencies and cost of installing a solar panel system.

SUMMARY OF EXAMPLE EMBODIMENTS

Accordingly, the present invention is directed to an improved panel mount base that substantially obviates one or more problems resulting from the limitations and deficiencies of the related art.

According to a first embodiment of the present application, Applicant discloses a kit for making a base assembly for securing a panel mounting device to a structure. The kit comprises: a lower member, an upper member, a surface fastener, and a connecting fastener.

The lower member comprises: a surface mounting element, a lower vertical element, and a lower end profile. The surface mounting element defines a surface mounting aperture configured to receive a surface fastener for securing the base to a surface. The lower vertical element is substantially perpendicular to the surface mounting element, and the lower vertical element defines a lower connection aperture. The lower end profile is a shape of the lower member when viewed normal to a longitudinal axis of the lower member.

The upper member comprises: a mount rail, an upper vertical element, and an upper end profile. The mount rail is configured to receive a panel mounting device. The upper vertical element is substantially perpendicular to the mount rail, and the upper vertical element defines an upper connection aperture. The upper end profile is a shape of the upper member when viewed normal to a longitudinal axis of the upper member, and the upper end profile is substantially identical to the lower end profile when rotated about the longitudinal axis 180 degrees.

The surface fastener is sized to fit through the surface mounting aperture for securing the base to the surface, and the connecting fastener is sized to fit through the lower connection aperture and the upper connection aperture when the upper member is rotated 180 degrees relative to the lower member thereby connecting the upper member and the lower member.

According to one alternate embodiment, the lower member and the upper member are manufactured using a single extrusion profile.

According to another alternate embodiment, the lower connection aperture is a slot.

According to a further alternate embodiment, the upper connection aperture is a slot.

According to still another alternate embodiment, the lower member further comprises a U-shaped cable holding element extending along the longitudinal axis of the lower member.

According to yet another alternate embodiment, the lower vertical element defines a plurality of lower connection apertures; the upper vertical element defines a plurality of upper connection apertures; and wherein each of the lower connection apertures is configured to align with a corresponding upper connection aperture.

According to still a further alternate embodiment, the lower member further comprises a second surface mounting element.

According to yet a further alternate embodiment, the surface mounting element defines a plurality of surface mounting apertures, and the base assembly further comprises a plurality of surface fasteners.

According to a second embodiment of the present application, Applicant discloses base for securing a panel mounting device to a structure. The base comprises: a lower member, an upper member, a surface fastener, and a connecting fastener.

The lower member comprises: a surface mounting element, a lower vertical element, and a lower end profile. The surface mounting element defines a surface mounting aperture configured to receive a surface fastener for securing the base to a surface. The lower vertical element is substantially perpendicular to the surface mounting element, and the lower vertical element defines a lower connection aperture.

The lower end profile is a shape of the lower member when viewed normal to a longitudinal axis of the lower member.

The upper member comprises: a mount rail, an upper vertical element, and an upper end profile, the mount rail is configured to receive a panel mounting device. The upper vertical element is substantially perpendicular to the mount rail, and the upper vertical element defines an upper connection aperture. The upper end profile is a shape of the upper member when viewed normal to a longitudinal axis of the upper member, and the upper end profile is substantially identical to the lower end profile when rotated about the longitudinal axis 180 degrees.

According to the second embodiment, the upper member is positioned so that the upper connection aperture is aligned with the lower connection aperture, and the connecting fastener extends through the lower connection aperture and the upper connection aperture to connect the upper member and the lower member. The surface fastener extends through the surface mounting aperture and into the surface for securing the base to the surface.

According to one alternate embodiment, the lower member and the upper member are manufactured using a single extrusion profile.

According to another alternate embodiment, the lower connection aperture is a slot.

According to a further alternate embodiment, the upper connection aperture is a slot.

According to still another alternate embodiment, the lower member further comprises a U-shaped cable holding element extending along the longitudinal axis of the lower member.

According to yet another alternate embodiment, the lower vertical element defines a plurality of lower connection apertures; the upper vertical element defines a plurality of upper connection apertures; and wherein each of the lower connection apertures is configured to align with a corresponding upper connection aperture.

According to still a further alternate embodiment, the lower member further comprises a second surface mounting element.

According to yet a further alternate embodiment, the surface mounting element defines a plurality of surface mounting apertures, and the base assembly further comprises a plurality of surface fasteners.

According to another further alternate embodiment, the base comprises the mounting device which is connected to the mount rail of the upper member.

BRIEF DESCRIPTION OF THE DRAWINGS

The invention will now be described, by way of example, with reference to the accompanying drawings, which are incorporated in and constitute a part of the specification, in which.

DRAWING REFERENCE NUMERALS

Figure 1:
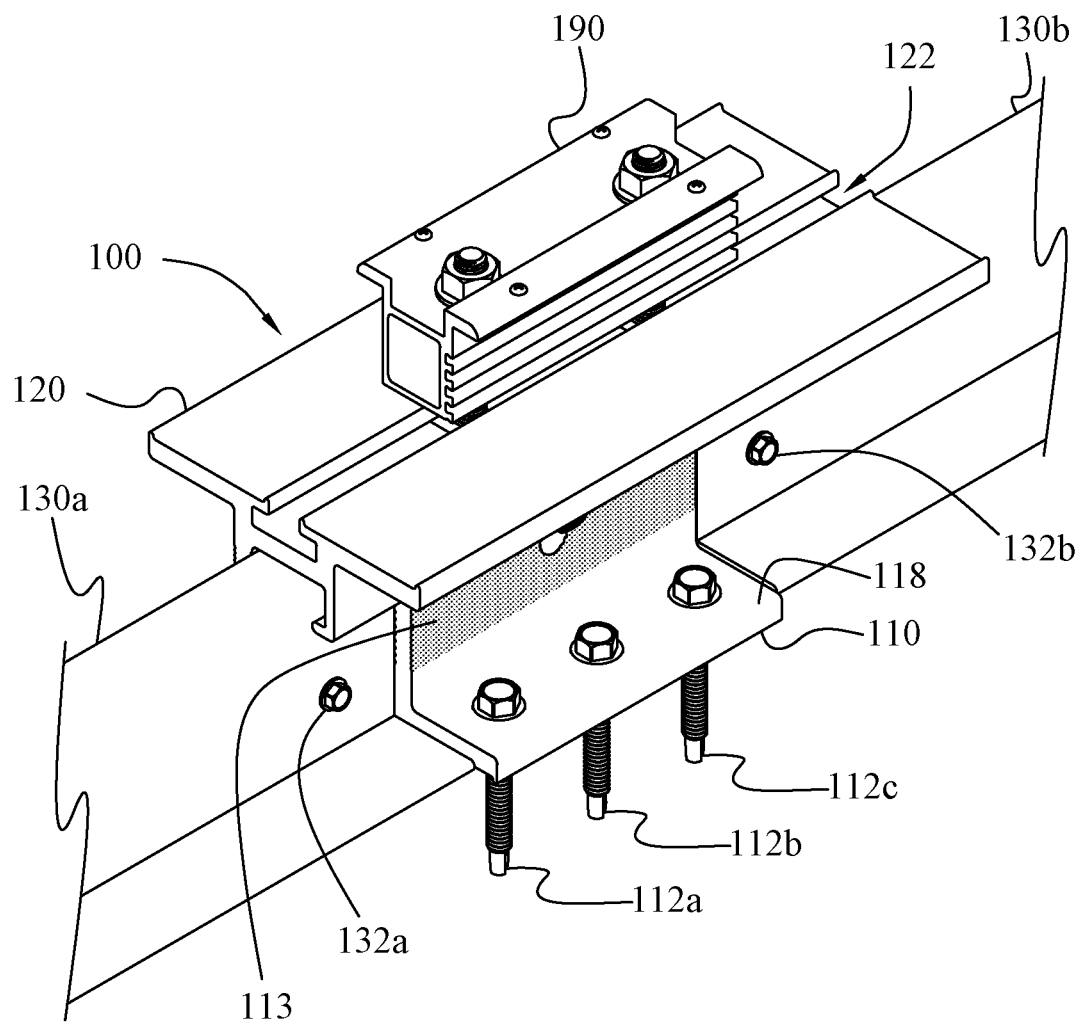
FIG. 1 is an orthographic view of an example base comprising a mounting device.

The following reference characters identify the associated elements depicted in the drawings describing the present invention:

| | |
|---|---|
| 100 | Base Assembly |
| 110 | Lower Member |
| 111 | Cable Holding Element |
| 112a | Surface Fastener |
| 112b | Surface Fastener |

-continued

DRAWING REFERENCE NUMERALS

The following reference characters identify the associated elements depicted in the drawings describing the present invention:

| | |
|---|---|
| 112c | Surface Fastener |
| 113 | Lower Vertical Element |
| 114 | Connecting Bolt/Fastener |
| 116 | Connecting Nut |
| 117 | Lower Connecting Aperture |
| 118 | Surface Mounting Element |
| 119 | Surface Mounting Aperture |
| 120 | Upper Member |
| 122 | Mount Rail |
| 223 | Upper Vertical Element |
| 130a | Trim |
| 130b | Trim |
| 132a | Trim Fastener |
| 132b | Trim Fastener |
| 190 | Mounting Device |

DETAILED DESCRIPTION

Particular embodiments of an example device and system will now be described in greater detail with reference to the figures. It should be understood that although the drawings depict and the present application describes a fully assembled base, it is envisioned that an inventive base may be provided in an unassembled state as a kit. Like reference numerals apply to similar parts throughout the several views.

The base is made up of two identical extrusion profiles which serve as the connection hardware for the surface and as the landing area for the panel and receiving profile for the clamping hardware. The lower member comprises: a surface mounting element, a lower vertical element, and a lower end profile. The surface mounting element defines a surface mounting aperture configured to receive a fastener for securing the base to a surface. The lower vertical element is substantially perpendicular to the surface mounting element incorporating ribbing to mate with opposing upper member, and the lower vertical element defines a lower connection aperture. The lower end profile is normal to a longitudinal axis of the lower member.

Figure 2:
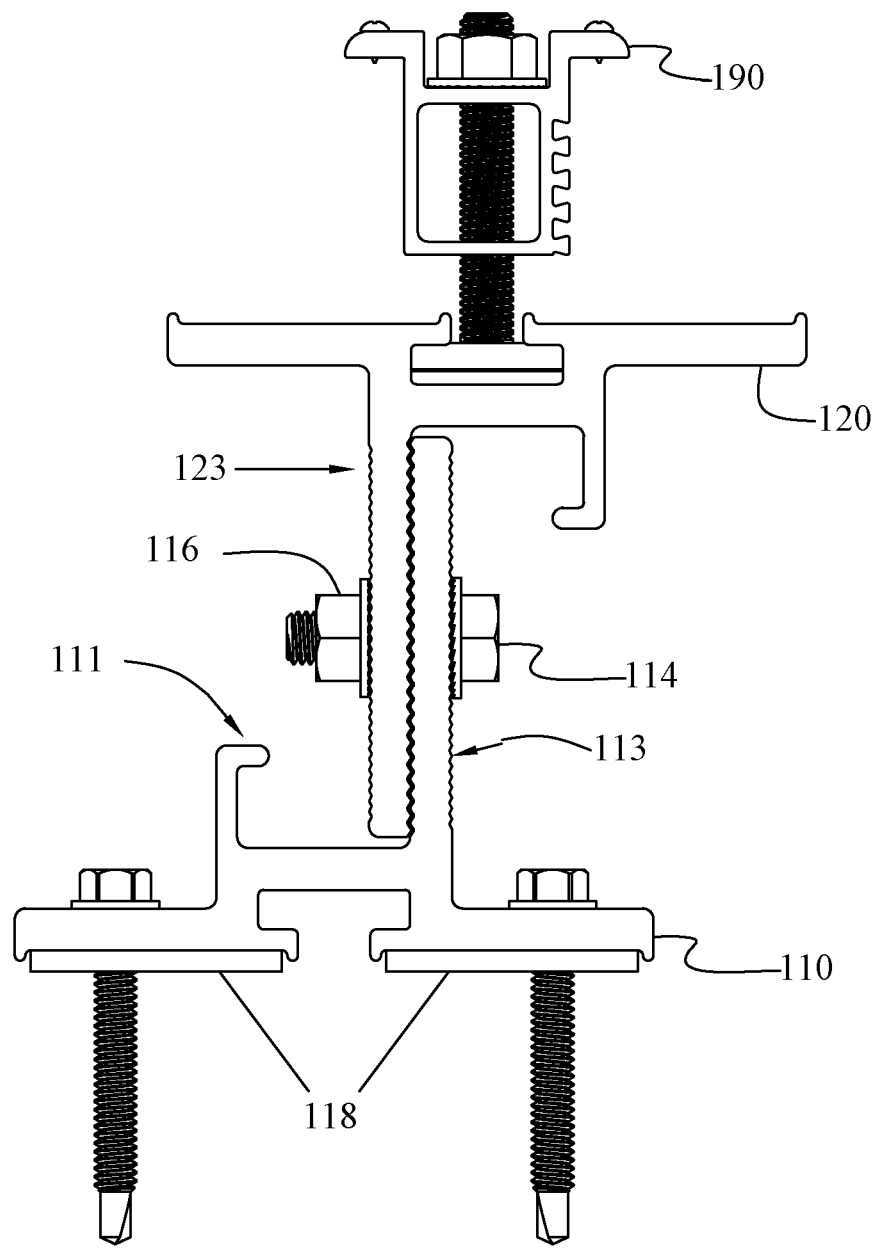
FIG. 2 is a side view of the first example base.
Figure 3:
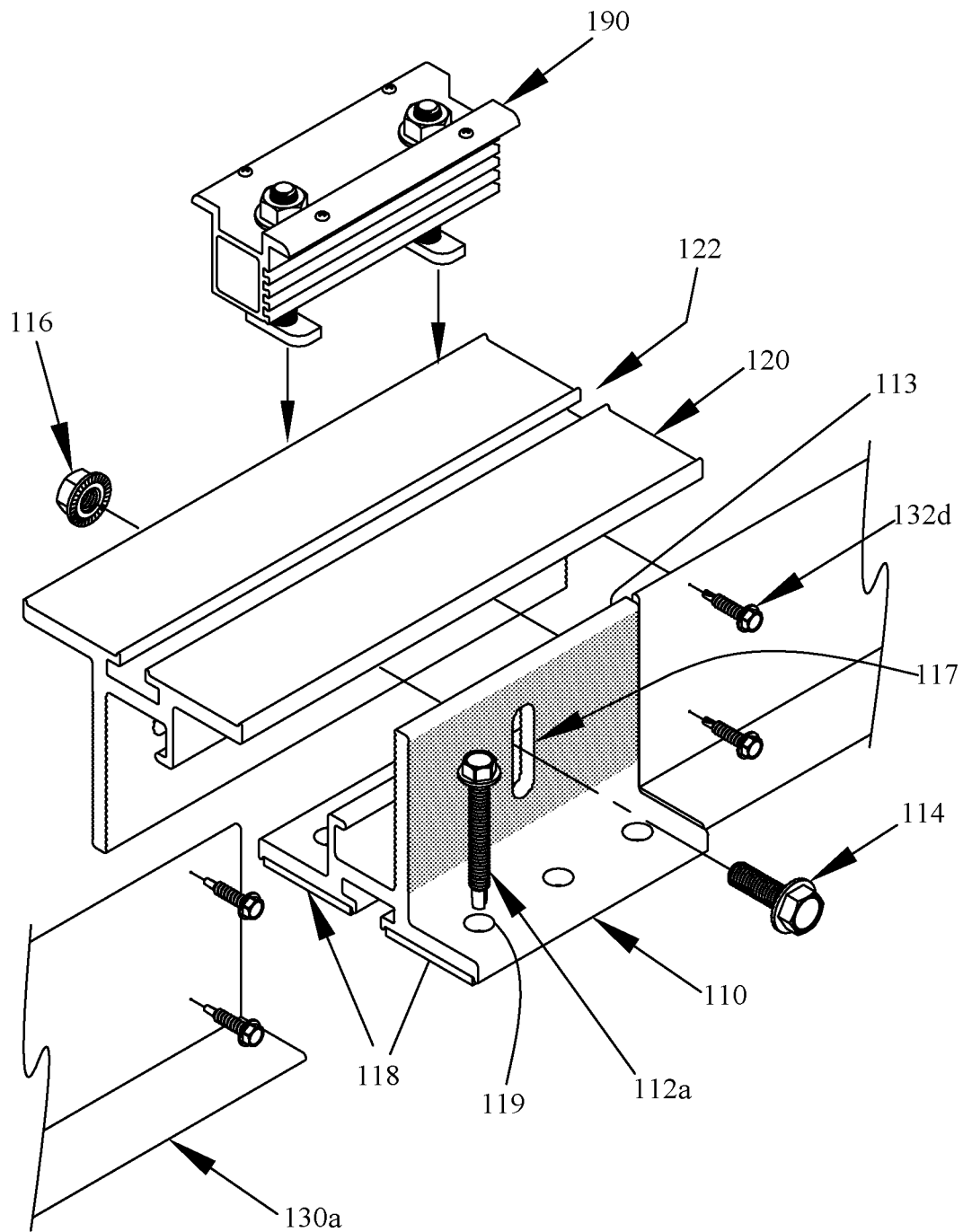
FIG. 3 is an exploded view of the example base.

FIGS. 1-3 illustrate the base of the present application. FIG. 1 is an orthographic view of a base 100 which comprises a lower member 110 and an upper member 120. As illustrated, base 100 functions to support a mounting device 190 which is optionally included as part of the base 100. In some embodiments, the base 100 and mounting device 190 will be provided separately.

Lower member 110 comprises at least one horizontal surface mounting element 118. As best illustrated in FIG. 2, base 100 comprises two such elements 118 which may be augmented with a protective layer to prevent damage to the surface upon which base 100 is to be mounted. Each surface mounting element 118 forms at least one surface mounting aperture 119. In the illustrative embodiment, each surface mounting element 118 forms three (3) surface mounting apertures 119. In FIG. 1, three (3) surface fasteners 112a, 112b, and 112c are shown inserted through respective surface mounting apertures 119.

Lower member 110 further comprises a lower vertical element 113 which forms a lower connection aperture 117. Lower vertical element 113 may comprise ridges for securely mating with another element such as upper vertical member 123 described below. Lower member 110 comprises a lower end profile. The lower end profile is the shape that can be seen by viewing lower member 110 from either side, along the longitudinal axis of base 100. The lower end profile is best seen in FIG. 2. Notably, upper member 120 comprises an upper end profile that is substantially identical to the lower end profile. In FIG. 2, it can be seen that upper member 120 has the same profile as lower member 110 except that it is rotated about a longitudinal axis 180 degrees.

Upper member 120 comprises a mount rail 122 into which mounting device 190 may be mounted. Mount rail 122 has a profile similar to prior art rails conventionally used to mount panels. Mounting device 190 may be conventionally secured to mount rail 122 by two T-bolts. Unlike the traditional rails, which span nearly the entirety of one dimension of an array of panels, mount rail 122 is shorter, but the conventional rail profile enables it to accept and cooperate with prior art mounting devices. Upper member 120 further comprises an upper vertical element 123 which forms an upper connection aperture 127. Upper vertical element 123 may comprise ridges that cooperate with ridges of lower vertical element 113, thereby providing additional structural stability.

As shown in FIGS. 1-3, upper connection aperture 227 and lower connection aperture 127 may be aligned to enable connecting fastener 114 to pass through. Connecting fastener 114 may be secured using connecting nut 116, thereby securely connecting upper element 120 and lower element 110. In some embodiments, either upper connection aperture 227 or lower connection aperture 127, or both, may be a slot to enable the height of base 100 to be adjusted. In the illustrated embodiment, base 100 may have a height ranging from 5.72 inches to 6.73 inches.

As shown in FIG. 1, optional trim pieces 130a and 130b may be affixed to base 100 using trim fasteners 132a and 132b. Trim 130a and 130b may be aesthetically pleasing and/or may hide unsightly hardware elements of a panel installation. Further, lower member 110 and upper member 120 may be shaped or extruded to form a cable holding element, such as cable holding element 111. Cable holding element 111 allows cables and other elements to be tucked away and stored out of sight. The lip of cable holding element 111 operates to retain any contents store within cable holding element 111.

As set forth above, the inventive base is comprises an upper member and a lower member where the two members have substantially identical profiles, sometimes referred to as extrusion profiles. The base, comprising the two elements, serves as the connection hardware for the surface, as the landing area for the panel, and as a receiving profile for the clamping hardware.

By using the identical extrusion profile for both the upper member and the lower member, the inventive mount is more efficient to produce, distribute, and stock. Further, by having an identical profile, cables can be stored via the upper element or the lower element. Still further, the identical profiles enable the ridged vertical surfaces to cooperate to allow for various base heights while providing increased stability.

While the devices, systems, methods, and so on have been illustrated by describing examples, and while the examples have been described in considerable detail, it is not the intention of the applicant to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A kit for making a base assembly for securing a panel mounting device to a structure, the kit comprising:
    a lower member, the lower member comprising:
        a surface mounting element, the surface mounting element defining a surface mounting aperture configured to receive a fastener for securing the base to a surface,
        a lower vertical element substantially perpendicular to the surface mounting element, the lower vertical element defining a lower connection aperture, and
        a lower end profile normal to a longitudinal axis of the lower member;
    an upper member, the upper member comprising:
        a mount rail configured to receive a panel mounting device,
        an upper vertical element substantially perpendicular to the mount rail, the upper vertical element defining an upper connection aperture, and
        an upper end profile normal to a longitudinal axis of the upper member, the upper end profile being substantially identical to the lower end profile;
    a surface fastener, the surface fastener being sized to fit through the surface mounting aperture for securing the base to the surface;
    a connecting fastener, the connecting fastener being sized to fit through the lower connection aperture and the upper connection aperture when the upper member is rotated about its longitudinal axis 180 degrees relative to the lower member to connect the upper member and the lower member.

2. The kit of claim 1, wherein the lower member and the upper member are manufactured using a single extrusion profile.

3. The kit of claim 1 wherein the lower connection aperture is a slot.

4. The kit of claim 1 wherein the upper connection aperture is a slot.

5. The kit of claim 1 wherein the lower member further comprises a U-shaped cable holding element extending along the longitudinal axis of the lower member.

6. The kit of claim 1 wherein:
the lower vertical element defines a plurality of lower connection apertures;
the upper vertical element defines a plurality of upper connection apertures; and
wherein each of the lower connection apertures is configured to align with a corresponding upper connection aperture.

7. The kit of claim 1 wherein the lower member further comprises a second surface mounting element.

8. The kit of claim 1 wherein the surface mounting element defines a plurality of surface mounting apertures, and the base assembly further comprises a plurality of surface fasteners.

9. A base for securing a panel mounting device to a structure, the base comprising:
a lower member, the lower member comprising:
a surface mounting element, the surface mounting element defining a surface mounting aperture configured to receive a fastener for securing the base to a surface,
a lower vertical element substantially perpendicular to the surface mounting element, the lower vertical element defining a lower connection aperture, and
a lower end profile normal to a longitudinal axis of the lower member;
an upper member, the upper member comprising:
a mount rail configured to receive a panel mounting device,
an upper vertical element substantially perpendicular to the mount rail, the upper vertical element defining an upper connection aperture, and
an upper end profile normal to a longitudinal axis of the upper member, the upper end profile being substantially identical to the lower end profile;
a surface fastener; and
a connecting fastener;
whereby the upper member is disposed so that the upper end profile rotated about its longitudinal axis 180 degrees relative to the lower end profile and positioned so that the upper connection aperture is aligned with the lower connection aperture, the connecting fastener extends through the lower connection aperture and the upper connection aperture to connect the upper member and the lower member, and the surface fastener extends through the surface mounting aperture and into the surface for securing the base to the surface.

10. The base of claim 9 wherein the lower member and the upper member are manufactured using a single extrusion profile.

11. The base of claim 9 wherein the lower connection aperture is a slot.

12. The base of claim 9 wherein the upper connection aperture is a slot.

13. The base of claim 9 wherein the lower member further comprises a U-shaped cable holding element extending along the longitudinal axis of the lower member.

14. The base of claim 9 wherein:
the lower vertical element defines a plurality of lower connection apertures;
the upper vertical element defines a plurality of upper connection apertures; and
wherein each of the lower connection apertures is configured to align with a corresponding upper connection aperture.

15. The base of claim 9 wherein the lower member further comprises a second surface mounting element.

16. The base of claim 9 wherein the surface mounting element defines a plurality of surface mounting apertures, and the base assembly further comprises a plurality of surface fasteners.

17. The base of claim 9 further comprising the mounting device connected to the mount rail of the upper member.

* * * * *